March 13, 1934.   R. F. MULLEN ET AL   1,951,200
CAR HEATER
Filed Jan. 16, 1932

Inventors
Raymond F. Mullen &
Thomas L. Lee
By
Blackmore, Spencer & Flint
Attorney Patented Mar. 13, 1934

1,951,200

UNITED STATES PATENT OFFICE 1,951,200

CAR HEATER

Raymond F. Mullen and Thomas L. Lee, Rochester, N. Y., assignors to General Motors Corporation, Detroit, Mich., a corporation of Delaware Application January 16, 1932, Serial No. 587,104

2 Claims. (Cl. 237—12.3)

This invention relates to heaters and has particular reference to a heater of the type which uses the hot water of the water circulating system of the engine of automotive vehicles.

The particular novelty of the invention resides in positioning the heating unit under the front seat of the vehicle and between the seat and the floor board so that it is out of the way and has substantially no portion which projects below the floor board.

Figure 1:
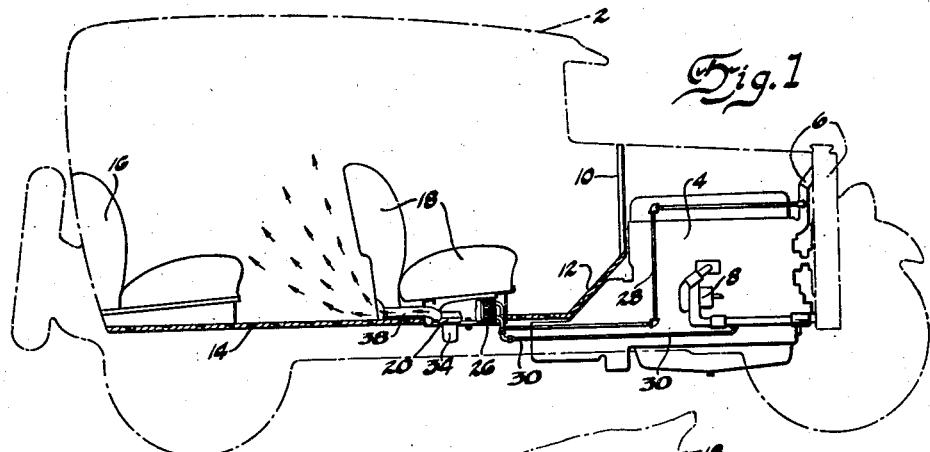
Figure 1 shows an automotive vehicle in outline with the heating unit applied.

Referring to the drawing, the numeral 2 indicates an automotive vehicle as a whole. The vehicle has the engine 4 with the water circulating system 6 including the water pump 8. The dashboard is indicated at 10, toe board at 12 and the floor at 14. The rear seat is indicated at 16 and the front seat at 18. The parts so far described are conventional and per se form no part of the invention.

Figure 2:
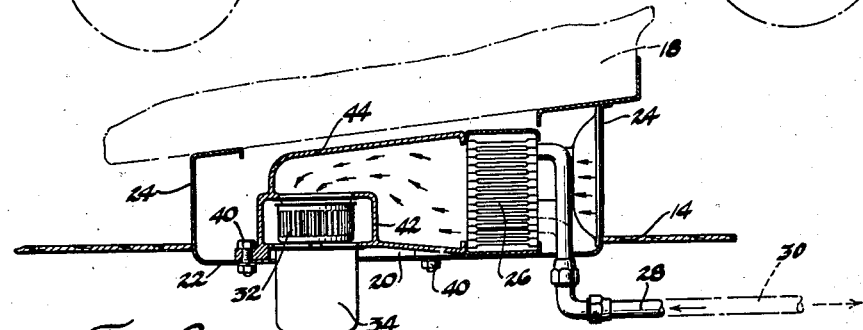
Figure 2 is an enlarged sectional view of the front seat with the heating unit in position.

The particular novelty of the invention resides in the placing of the heating unit, indicated as a whole at 20, under the front seat 18 and between the seat and floor 14, as best shown in Figure 2. In prior installations of heating units which use the hot water of the engine cooling system, the units invariably have been applied to the dashboard and as they take up some room, it has been found that they are in the way of the feet of the passenger at the side of the seat where the heating unit is installed. This is particularly objectionable in warm weather when there is no use for the heater. In the present invention, the heater is mounted below the seat where it is out of the way at all times and in no way interferes with the comfort of the passengers.

By referring to Figure 2, it will be noted that the seat 18 is supported on the pan 22 secured to the floor 14 and having the upright portions 24 on which the seat directly rests. The heating unit comprises the honeycomb heating unit 26 which receives water from the pipe 28 and delivers the water from the pipe 30 back to the cooling system. A fan or blower 32 operated by an electric motor 34 draws the air from the vehicle through openings in the support 24, as indicated by the arrows in Figure 2, through the honeycomb structure 26 to take up the heat from the heating unit.

Figure 3:
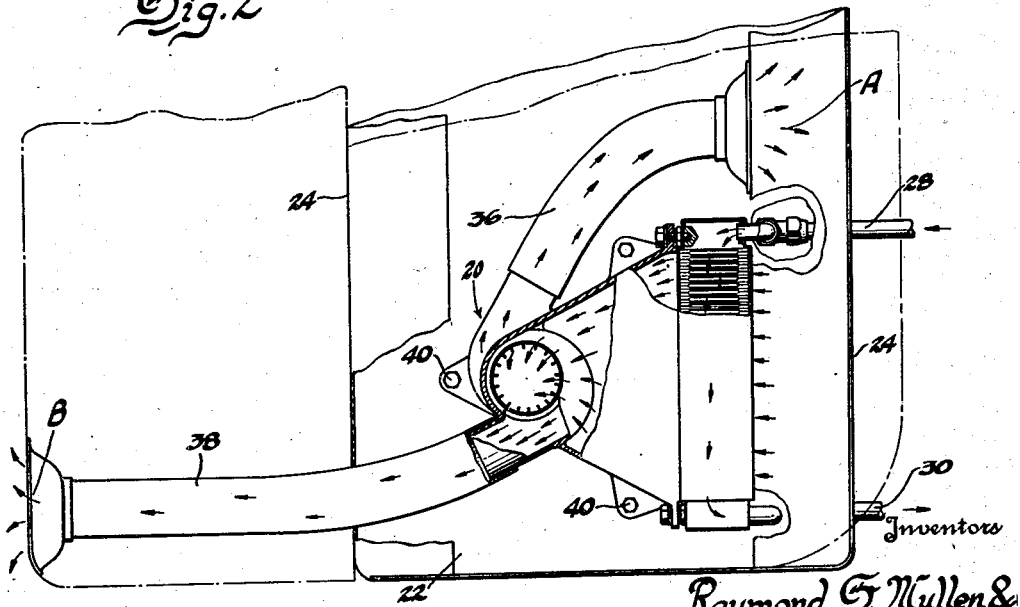
Figure 3 is an enlarged detailed plan view of the heating unit under the seat with parts broken away and shown in section.

The heated air is delivered by the blower into the passage 36 for delivery to the front compartment, as indicated by the arrows A in Figure 3, and to the passage 38 for delivery to the rear compartment, as indicated by the arrows B in Figure 3.

By referring to Figure 2, it will be noted that the heating unit is attached to the seat pan by means of the bolts and nuts 40, suitable rubber blocks (not shown) being used to obtain proper noise insulation. It will be noted that the entire heating unit, with the exception of the motor 34, is contained within the space between the seat and the floor board. There is, therefore, substantially no projecting portion which extends below the floor board or into the vehicle and the heating unit is out of the way at all times.

The motor 34 and blower 32 are shown held in a vertical position in a housing portion 42 of the heater casing 44 but, if desired, the blower and motor may be positioned horizontally.

Instead of the hot water from the engine, it is within the scope of the invention to pass steam through pipes 28 and 30 through the heater, the steam being generated from the water of the engine cooling system such as by placing a U-tube in the exhaust pipe at a suitable point.

We claim:

1. In combination with an automotive vehicle having a seat and an engine with a water circulating system, a heat interchanger positioned under the front vehicle seat and between the seat and the floor, inflow and outflow connections between the water circulating system and the heat interchanger, means within the space between the seat and the floor for drawing air from the vehicle through the heater, and means for delivering heated air from the heat interchanger to the front and rear of the seat.

2. In combination with an automotive vehicle having a seat, a pan beneath the seat and upon which the seat rests, a heating device under the seat and between the seat and the pan, said device mounted in the pan and including means to draw air from the vehicle into the device, and means for delivering heated air from the device into the vehicle.

RAYMOND F. MULLEN.
THOMAS L. LEE.